L. R. ROBERTS.
TYPE WRITING MACHINE.
APPLICATION FILED MAY 1, 1916.
1,192,459.
Patented July 25, 1916.
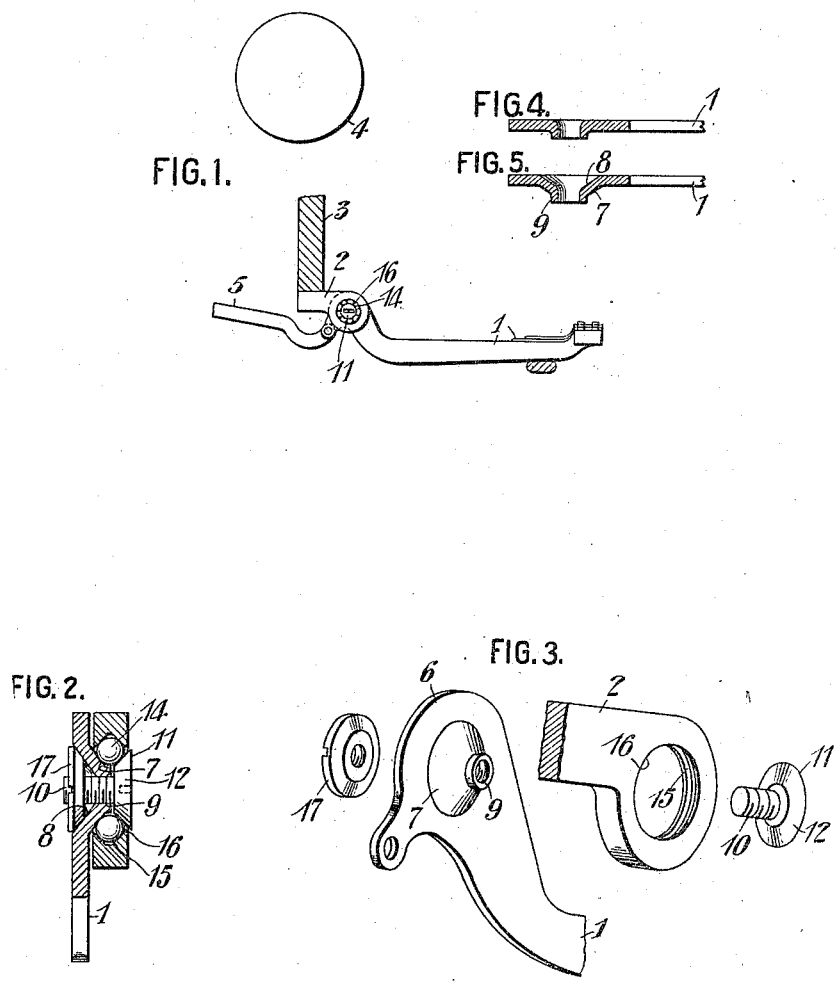

UNITED STATES PATENT OFFICE.

LYMAN R. ROBERTS, OF RUTHERFORD, NEW JERSEY, ASSIGNOR TO UNDERWOOD TYPEWRITER COMPANY, OF NEW YORK, N. Y., A CORPORATION OF DELAWARE.

TYPE-WRITING MACHINE.

1,192,459. Specification of Letters Patent. Patented July 25, 1916.

Original application filed November 18, 1914, Serial No. 872,682. Divided and this application filed May 1, 1916. Serial No. 94,546.

*To all whom it may concern:*

Be it known that I, LYMAN R. ROBERTS, a citizen of the United States, residing in Rutherford, in the county of Bergen and State of New Jersey, have invented certain new and useful Improvements in Type-Writing Machines, of which the following is a specification.

This invention relates to typewriting machines, and more particularly to the ball bearings of the type-bars. Owing to the necessity of mounting a great number of type-bars within a comparatively small space, it has been found necessary to employ balls that are so small as to be open to serious objection, as they are not sufficiently strong and large to guide a type-bar accurately and are soon worn.

A feature of this invention is the provision of an improved form of ball bearing for the type-bar, which is strong and durable, and at the same time extremely simple and inexpensive to manufacture, and which is constructed in such a manner as to permit the arrangement of many type-bars in a contracted space, while permitting the use of comparatively large balls.

This application is a division of my application Serial No. 872,682, filed November 18, 1914.

Other features and advantages will hereinafter appear.

In the accompanying drawings, Figure 1 is a side elevation showing the relative positions of the type-bars, the hanger, and the platen. Fig. 2 is a sectional view of my invention showing the parts in their normal working positions. Fig. 3 is a perspective view of the parts disassembled. Fig. 4 is a sectional view showing the type-bar in one stage of its manufacture. Fig. 5 is a sectional view showing the type bar in another and later stage of its manufacture.

The type-bars 1 are fulcrumed on hangers 2 connected to a frame 3, and are swung upwardly and rearwardly against a platen 4, to make impressions thereon. This is done by the depression of keys having connections thereto, which may comprise a link 5.

The type-bar 1 is preferably fulcrumed on the hanger 2. In order to permit the use of large balls for the bearings in a machine of this character, the center of the enlarged head 6 of the type-bar is drawn out, so as to produce on one side of the bearing a frusto-conical projection or cup 7, and on the other side thereof a depression or seat 8 of similar shape, the frusto-conical projection having a terminal in the form of a boss or nipple 9. This boss 9 is threaded for the reception of a screw 10, provided with a head 11, having a conical bearing surface 12.

The type-bar 1 and the screw 10, having their conical surfaces adjacent each other, form an annular V-shaped channel or groove, which taken with a V-shaped groove 15 formed in an eye 16 in the hanger 2, forms a ball race-way, which may be rectangular in cross-section, as seen in Fig. 2.

The screw 10 may be held in proper position with its conical bearing surface against the balls 14, by a lock-nut 17. The lock-nut is formed so as to fit within the concave depression or seat 8 of the head 6 of the type-bar, thereby taking up little if any space laterally of the type-bar. In addition to locking the screw 10 in proper position, this nut 17, in bearing against the type-bar, aids in holding the screw rigid.

In manufacturing, it has been found advantageous to draw out the metal at the central portion of the enlarged end or hub 6 of the type-bar (as shown in Fig. 4), so as to produce on one side of the bar a short tubular or open-end nipple. This operation forces the metal outward, so that the length of the nipple may be greater than the width of the type-bar. This affords more surface for threading to receive the screw 10, which is therefore given an extended bearing and an ample number of threads, thereby increasing the strength of the structure at this point. The metal is then drawn out, as seen in Fig. 5, so as to produce the frusto-conical surface against which the balls bear.

Variations may be resorted to within the scope of the invention, and portions of the improvements may be used without others.

Having thus described my invention, I claim:

1. The combination of a sheet metal bar having an offset portion providing an annular, tapered bearing surface, said offset portion having a threaded opening therein, a bearing screw threaded into said opening and having a tapered head which forms a complemental bearing surface, and a nut on the screw having its inner face tapered or inclined and bearing squarely against the rear face of the bar.

2. The combination of a sheet metal bar having a drawn or offset portion forming a projecting, conical bearing surface on one face of the bar, and a conical depression on the opposite face of the bar, said offset portion being provided with a central, screw-threaded opening, a bearing screw extending through said opening and having a tapered head forming a bearing surface complemental to said first-named bearing surface, and a nut on said screw seated in said depression and bearing against the bar.

3. The combination of a sheet metal bar having a drawn or offset portion forming a projecting conical bearing surface on one face of the bar and a conical depression on the opposite face of the bar, said offset portion being provided with a central screw-threaded opening, a bearing screw threaded through said opening and having a tapered head forming a bearing surface opposite said first-named bearing surface, a nut on said screw seated in said depression and bearing against the bar, a coöperating bearing member having a circular opening therein whose wall is provided with an annular recess which forms with said bearing surface an annular raceway, and bearing balls in said raceway.

4. The combination of a sheet metal type-bar having on one side a ball-bearing cone and on the other side a depression formed by pressing the metal of the bar into the shape of said cone, a hanger having an interiorly-grooved eye within which said cone is inserted, an adjustable screw threaded through said type-bar at the center of said cone and having a conical head to coöperate with said cone and with said groove to form a complete raceway, a set of balls running in said raceway, and a set nut threaded upon said screw and seated in said cone-shaped depression in said type-bar.

5. The combination with a sheet metal type-bar having a bearing surface, and a perforated hub portion projecting therefrom, of a screw threaded into said hub portion and having a complemental bearing surface to form with the bearing surface of the type-bar an annular ball-race for the type-bar, said type-bar being drawn or forced to form said bearing and hub, to give a threading surface prolonged beyond or greater than the normal thickness of the type-bar.

LYMAN R. ROBERTS.

Witnesses:
ARTHUR A. JOHNSON,
JOHN F. RULE.